(No Model.)
L. F. SMITH.
DEVICE FOR CHANGING RAILWAY CAR WHEELS.
No. 363,692. Patented May 24, 1887.
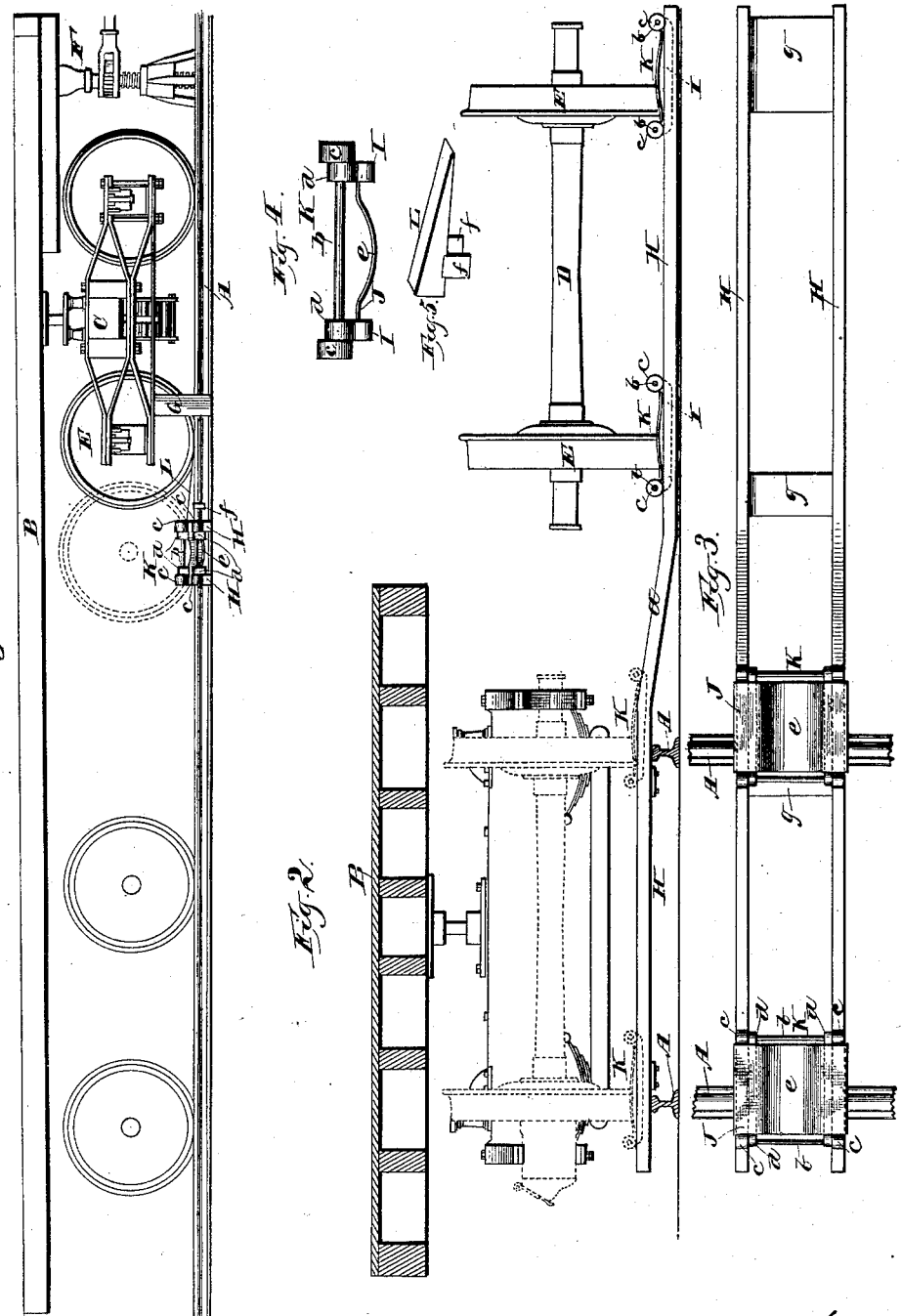
Witnesses:
E. G. Homus
Maurice F. Frear
Inventor:
Luther F. Smith
By Stout & Underwood
Attorneys

UNITED STATES PATENT OFFICE.

LUTHER F. SMITH, OF FORT HOWARD, WISCONSIN.

DEVICE FOR CHANGING RAILWAY-CAR WHEELS.

SPECIFICATION forming part of Letters Patent No. 363,692, dated May 24, 1887.

Application filed February 24, 1887. Serial No. 228,657. (No model.)

*To all whom it may concern:*

Be it known that I, LUTHER F. SMITH, of of Fort Howard, in the county of Brown, and in the State of Wisconsin, have invented certain new and useful Improvements in Devices for Changing Railway-Car Wheels; and I do hereby declare that the following is a full, clear, and exact description thereof.

My invention relates to devices for assisting in changing wheels under a railway-car; and it consists in certain details of construction, as will be particularly described hereinafter, and pointed out in the claims.

In the drawings, Figure 1 is a side elevation of a railway-track, showing my devices in place thereon, with the bottom of the car jacked up, and also showing one of the trucks with one of its axles and the wheels belonging thereto ready to be removed. Fig. 2 is a side view of my devices in place on a railway-track under a car, showing in dotted lines an axle and its wheels ready to be removed and in full lines the same in transit. Fig. 3 represents a plan view of my removable track and carriers, and Fig. 4 an end elevation of one of the latter. Fig. 5 is a detail.

A A represent the rails of an ordinary railroad-track, and B the bottom of a freight-car.

C represents one of the trucks of the latter, and D an axle, with its wheels E E forming a part of said truck.

F represents a jack whereby the end of the car nearest said truck is raised, and G one of the blocks placed under the frame of the truck just back of the axle-boxes of the axle to be removed.

My special apparatus consists, first, of the removable narrow track, having rails H H, united by plates or ties *g g* on the under side and raised or curved up at the point *a*, so that one end of my track will rest upon the railroad-rails A A at a plane above the balance of my said track, which rests on the ground; secondly, of the carriers K, Fig. 4, and, thirdly, of the inclines L, Fig. 5. The carriers K are two in number, each designed to support one wheel of the axle being removed or changed.

Each carrier has two axles, *b b*, with wheels *c c*, designed to travel on the rails H H, and mounted on the said axles, just inside of these wheels *c c*, are the bearings *d d* of the carrier-guides I I, which fit just inside and alongside of the track-rails H H, as shown in dotted lines in Fig. 2.

J is a plate or frame resting on and secured to the guides I I, and preferably concaved or rounded between them, as shown at *e*, to receive the wheels E of the axle being moved, as shown in dotted lines in Fig. 1.

The inclines L are preferably formed with downwardly-projecting lugs *f f*, (of any number desired,) which straddle the railroad-track rails to keep the said inclines in place.

The operation of my device will be readily understood from the foregoing description of its construction, taken in connection with the drawings. One end of the car is jacked up, as shown, the blocks G G placed under the the frame of the trucks near the boxes of the axle to be removed, and the inclines L L placed in position on the railroad-rails A A, and the removable track H H *g* placed across said rails, close up against the said inclines, with the carriers K K in position to receive the wheels E E of the axle to be removed, just as shown in dotted lines in Fig. 2. The bolts, axle-boxes, &c., which confine the axle to its truck are then removed and the wheels E E rolled up the inclines L L and onto the carriers K K, one wheel resting on the concave surface of the plate J between the axles *b b* of each carrier, and then the two carriers thus connected are drawn down the tracks H H, as shown in full lines at the right of Fig. 2, and the axle and wheels rolled off and replaced by another axle with wheels, whereupon the reverse of this action takes place, and the new axle is secured to place in the truck in an infinitely less time and with fewer men than are now required for this service.

Having thus fully described my invention, what I claim as new, and desire to secure by Letters Patent, is—

1. In a device for changing railway-car wheels, the combination of a removable track adapted to rest transversely across the railroad-track, and carriers adapted to travel on the removable track and receive the wheels of the axle to be moved or changed, substantially as set forth.

2. In a device for changing railway-car wheels, a removable track adapted to rest transversely across the railroad-track, in combination with carriers having wheels running on the said removable track, guides to keep the said carriers in place thereon, and a plate or frame to receive the wheels of the axle to be moved or changed, substantially as set forth.

3. In a device for changing railway-car wheels, a carrier consisting of two axles with wheels at their ends, in combination with longitudinal guides suspended from the said axles just inside the said wheels, and a plate or frame secured to the upper surface of said guides between and below the axles and concaved between the guides, substantially as set forth.

4. In a device for changing railway-car wheels, the combination of a removable track adapted to rest transversely across the railroad-track, an incline detachably arranged on each rail of the railroad-track adjacent to one rail of the removable track, and carriers adapted to travel on the latter and receive the wheels of the axle to be removed or changed, substantially as set forth.

In testimony that I claim the foregoing I have hereunto set my hand, at Green Bay, in the county of Brown and State of Wisconsin, in the presence of two witnesses.

LUTHER F. SMITH.

Witnesses:
CHARLES E. VROMAN,
A. C. SMITH.